US011611396B2

(12) United States Patent
Schaeffer

(10) Patent No.: US 11,611,396 B2
(45) Date of Patent: Mar. 21, 2023

(54) SECURITY SHUTTER

(71) Applicant: pureLiFi Limited, Edinburgh (GB)

(72) Inventor: Ron Schaeffer, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 71 days.

(21) Appl. No.: 16/756,399

(22) PCT Filed: Oct. 15, 2018

(86) PCT No.: PCT/GB2018/052953
§ 371 (c)(1),
(2) Date: Apr. 15, 2020

(87) PCT Pub. No.: WO2019/077319
PCT Pub. Date: Apr. 25, 2019

(65) Prior Publication Data
US 2021/0194592 A1    Jun. 24, 2021

(30) Foreign Application Priority Data
Oct. 16, 2017 (GB) ..................................... 1716944

(51) Int. Cl.
*H04B 10/508* (2013.01)
*H04W 12/65* (2021.01)
(Continued)

(52) U.S. Cl.
CPC ......... *H04B 10/508* (2013.01); *H04B 10/116* (2013.01); *H04B 10/501* (2013.01); *H04L 63/0861* (2013.01); *H04W 12/65* (2021.01)

(58) Field of Classification Search
None
See application file for complete search history.

(56) References Cited

U.S. PATENT DOCUMENTS 6,870,989 B1 * 3/2005 Devenyi ............ G02B 6/29395
385/39
7,113,662 B2 * 9/2006 Persson ............... H04J 14/0213
385/20
(Continued)

FOREIGN PATENT DOCUMENTS

WO    WO 2016/153512    9/2016
WO    WO 2017/069490    4/2017

OTHER PUBLICATIONS

International Search Report and Written Opinion issued in PCT/GB2018/052953 filed Oct. 15, 2018.
(Continued)

*Primary Examiner* — Darren E Wolf
(74) *Attorney, Agent, or Firm* — Womble Bond Dickinson (US) LLP

(57) ABSTRACT

An optical wireless communication device comprises: at least one of a transmitter and a receiver configured to transmit and/or receive light comprising an optical wireless communication signal representing data; at least one adjustable shutter element associated with the at least one of a transmitter and a receiver, wherein the at least one adjustable shutter element and the associated at least one of the transmitter and the receiver are adjustable between a first configuration and a second configuration such that in the first configuration the at least one adjustable shutter element is configured to at least partially block or partially redirect light having a first selected property and at least partially allow light having a second selected property to pass through unaffected such that transmission and/or reception of the optical wireless communication signal by the at least one of the transmitter and the receiver is substantially altered.

13 Claims, 9 Drawing Sheets

(51) Int. Cl.
  *H04B 10/116*   (2013.01)
  *H04B 10/50*   (2013.01)
  *H04L 9/40*   (2022.01)

(56) References Cited

U.S. PATENT DOCUMENTS

| | | |
|---|---|---|
| 8,242,924 B2 | 8/2012 | Huang et al. |
| 8,823,870 B2 | 9/2014 | Tsai et al. |
| 9,197,850 B2 | 11/2015 | Koberling |
| 9,729,236 B2 | 8/2017 | Hyde et al. |
| 2009/0310971 A1* | 12/2009 | Kim .................. H04B 10/1149 398/103 |
| 2012/0128365 A1 | 5/2012 | Paek et al. |
| 2013/0188950 A1* | 7/2013 | Sakauchi ............ H04J 14/0213 398/79 |
| 2016/0149645 A1* | 5/2016 | Liu ........................ H04B 10/40 398/135 |

OTHER PUBLICATIONS

Baetens, R. et al. "Properties, requirements and possibilities of smart windows for dynamic daylight and solar energy control in buildings: A state-of-the-art review". Solar Energy Materials and Solar Cells. 94 (2): 87-105, 2010.
https://web.archive.org/web/20170708170802/https://protect.somfy.co.uk/uk/ (archived copy of https://protect.somfy.co.uk/, retrieved from WayBack Machine dated Jul. 8, 2017).
Wasinee Noonpakdee et al., "Hybrid RFID employing optical wireless communication," IEEE, 2010.

* cited by examiner

SECURITY SHUTTER

CROSS-REFERENCE TO RELATED APPLICATIONS

This application is a national phase application filed under 35 U.S.C. § 371 of International Application No. PCT/GB2018/052953, filed Oct. 15, 2018, which claims priority to GB 1716944.2, filed Oct. 16, 2017.

FIELD

The present invention relates to an optical wireless communication device, for example a security device.

BACKGROUND

It is known to provide wireless data communications by using light instead of radio frequencies to transmit and receive data wirelessly between devices. Data may be transmitted using light by modulating at least one property of the light, for example an intensity of the light. Methods that use light to transmit data wirelessly may be referred to as optical wireless communications (OWC) or light communications (LC).

Different OWC protocols, for instance visible light communication (VLC) protocols, have different characteristics. For example, Li-Fi communication provides for high bandwidth, full-duplex communication using visible light or a combination of visible light and non-visible light, and can provide for the use of spectrum hopping and other spread spectrum techniques.

Wireless networks using visible light may in some circumstances allow a higher data capacity, greater energy efficiency and greater security than radio frequency wireless networks, and may also be used to replace point-to-point infrastructure in locations where conventional infrastructure does not exist or is too expensive to build.

OWC may provide communication using any suitable light source. For example OWC may provide simultaneous wireless communication and illumination from luminaires (for example, LED luminaires) that have traditionally only been utilised for lighting or notification purposes. Thus, simultaneous optical wireless communication and illumination or other function may be provided. Optical wireless communication in such cases may be provided by modulating, for example, an intensity of the light produced by the luminaires so that data that is to be transmitted is represented by the modulation of the light. Usually the modulation of the light occurs at such a frequency that it is imperceptible to the naked eye.

Optical wireless communication may normally provide line-of-sight, or reflected, communication between two compatible devices, each of which includes a light transmitter and/or receiver.

Due to the imperceptible and/or invisible nature of OWC, a transmitter may transmit or a receiver may receive OWC signals without knowledge or permission of the user. This may occur, for example, in the event that an optical wireless device is controlled by an unauthorised third party, for example by a malicious software application. An entire OWC network could be compromised by a malicious transmitter entering the field of view of a transmitter. This is a problem, in particular in a highly secure environment.

There are limitations to implementing visual indicators for an OWC system. For example, cameras on some computer devices comprise light emitting diode indicators that are activated when the camera is in use. However, these indicators are also susceptible to activity from hackers and may provide a false indication.

SUMMARY

According to a first aspect of the present invention, there is provided an optical wireless communication device comprising: at least one of a transmitter and a receiver configured to transmit and/or receive light comprising an optical wireless communication signal representing data; at least one adjustable shutter element associated with the at least one of a transmitter and a receiver, wherein the at least one adjustable shutter element and the associated at least one of the transmitter and the receiver are adjustable between a first configuration and a second configuration such that in the first configuration the at least one adjustable shutter element is configured to at least partially block or partially redirect light having a first selected property and at least partially allow light having a second selected property to pass through unaffected such that transmission and/or reception of the optical wireless communication signal by the at least one of the transmitter and the receiver is substantially altered.

The light may comprise visible light and/or non-visible light. For example, light may comprise visible light, infra-red light or ultra-violet light. Optionally, the light may comprise electromagnetic waves with wavelengths in a range 1 nm to 2500 nm, which includes ultraviolet, visible light and near-infra-red wavelengths.

The transmitter may transmit light at a first wavelength, the receiver may be sensitive to light at a second, different wavelength, and the at least one shutter element may have a wavelength-dependent transparency such that it is substantially transparent to light at one of the first wavelength and the second wavelength, and substantially opaque to light at the other of the first wavelength and the second wavelength.

The at least one shutter element may further comprise a mechanism for moving the at least one adjustable shutter element having a wavelength-dependent transparency into or out of a field of view of the transmitter and/or the receiver to adjust between the first configuration and the second configuration.

The device may further comprise a controller configured to establish a communication channel with an access point or further device via the receiver whilst preventing transmission from the transmitter to the access point or further device, and optionally to move from the first configuration to the second configuration in response to a signal received through the communication channel thereby to allow transmission of data by the transmitter to the access point or further device when in the second configuration.

The at least one shutter element may cover both the transmitter and the receiver when in the first configuration.

The at least one adjustable shutter element may comprise a first adjustable shutter element associated with the transmitter and a second adjustable shutter element associated with the receiver. The first and second adjustable elements may be configured to be adjusted independently.

The transmission and/or reception of the optical wireless communication signal may be substantially altered such that transfer of the data via the optical wireless communication signal is at least one of reduced, disrupted or restricted.

The first property and/or second selected property may comprise at least one of: a wavelength in a wavelength range; a data rate in a data rate range; a propagation direction in a field of view; a polarisation in a range of polarisations.

The first selected property may be a first wavelength in a first range of wavelengths and the second selected property may be a second wavelength in a second range of wavelengths.

The first selected property may be a first data rate and the second selected property may be a second data rate. The first data rate may be lower than the second data rate or vice versa.

The first selected property may be a first direction of propagation in a first field of view and the second selected property may be a second direction of propagation in a second field of view. The first field of view may be narrower or wider than the second field of view.

The first selected property may be a first polarisation and the second selected property may be a second polarisation The device may further comprise a mechanism for moving the at least one adjustable shutter element relative to the at least one of the transmitter and the receiver to adjust between the first configuration and the second configuration. The adjustable shutter element may comprise any suitable mechanism for physically moving the shutter element. The mechanism may comprise a slide mechanism to substantially cover the at least one of a transmitter and a receiver with the at least one shutter element.

The at least one shutter element may be moveable and the at least one of a transmitter and a receiver may be fixed, relative the device, or the at least one of a transmitter and a receiver may be moveable and the at least one shutter element may be fixed, relative to the device. The mechanism may comprise a flipping mechanism The at least one shutter element may comprise a cavity provided on the device such that the at least one of the transmitter and the receiver is substantially contained in the cavity in the second configuration.

In the second configuration and in the first configuration, the at least one adjustable shutter element may at least partially cover the at least one of the transmitter and the receiver.

The at least one adjustable shutter element may comprise a diaphragm, through which an opening is defined that allows light to pass through, wherein the diaphragm is controllable to control the size of the opening. The diaphragm may be an iris diaphragm or a spiral shutter. The diaphragm may have more than one opening of different sizes, and suitable means for selecting the diaphragm that light passing to or from the at least one of the transmitter and/or receiver passes through.

The at least one adjustable shutter element may comprise a window element configured to be at least partially opaque to light.

The window element may be configured to change one or more optical properties in response to a physical stimulus.

The window element may be configured to change between substantially transparent and substantially opaque in response to a physical stimulus. The change may depend on wavelength. Thus, for example, in response to the physical stimulus the window element may remain transparent for one of the wavelengths or ranges of wavelengths (e.g. infra-red or visible) and may change between substantially transparent and substantially opaque for another of the wavelengths or ranges of wavelengths (e.g. visible or infra-red) The window element may be partially transparent to light having a wavelength in a range of wavelengths.

The physical stimulus may comprise at least one of an electronic, chemical, thermal or optical stimulus. The change of one or more optical properties may be reversible.

The window element may comprise a window element material, wherein the window element material comprises at least one of: a smart-glass material, a switchable glass material, a liquid crystal switchable mirror material, for example polymer dispersed liquid crystals, suspended particles, micro-blinds, an electrochromic material, a thermochromic material, a photochromic material and micro-electromechanical system (MEMS) material.

The window element may comprise a thin flexible sheet formed out of the window element material.

The first selected property may be a first wavelength in a first range of wavelengths and the second selected property may be a second wavelength in a second range of wavelength. The first wavelength range may correspond to infra-red light and the second wavelength range may correspond to visible light.

The data carried by light having the first property may be secured and/or encrypted and the data carried by light having the second property may be unsecure and/or unencrypted or vice versa.

The at least one adjustable shutter element and at least one of the transmitter and the receiver may be configured to be manually adjusted by a user.

The device may further comprise a drive arrangement operable to adjust the at least one adjustable shutter element and the at least one of the transmitter and the receiver wherein the drive arrangement may be electrically, magnetically and/or electro-magnetically powered.

The device may further comprise or be in communication with or connectable (via wired or wireless connection and/or LAN or other network) to a controller configured to automatically control adjustment of the at least one adjustable shutter element.

The controller may be further configured to adjust the at least one adjustable shutter element between the first and second configuration at a switching frequency. The switching frequency may be selected to allow low data rate signals to pass and to block and/or redirect high data rate signals.

The controller may be further configured to adjust the at least one adjustable shutter element between the first and second configuration to encode/decode a further message on an optical signal. The controller may be configured to control the adjustment of the at least one adjustable shutter element based on an authentication process.

The controller may be configured to control the adjustment of the of the at least one adjustable shutter element in response to a failure to complete the authentication process.

The device may be further configured to initiate or take part in the authentication process in response to a detection of an unauthorised action or event.

The authentication process may comprise biometric authentication. The authentication process may be based on at least one of a location of optical device relative to a further device, user credentials, time, a predetermined schedule, a password, identity and/or status of the further device.

The authentication process may be in accordance with an authentication protocol, optionally, wherein the authentication protocol is one of: a challenge handshake authentication protocol, a 4-way handshake protocol, a 4-way handshake protocol as specified in 802.11.

The controller may be configured to control the adjustment of the at least one adjustable shutter element based on a control signal, for example received from a further device.

The control signal may be based on at least on one attribute of the or a further device, for example, a location of the further device (absolute location or location relative to the device or other entity), an identity or type of the further device, an operating status or setting of the further device, a security status or setting of the further device, a communication status of the further device, whether or not the further device is in communication range of the device and/or in a field of view of the device, whether or not the further device or the device is on a list of authorised or unauthorised device, for example a white list or black list, whether or not data sent from the further device is in a non-allowed or suspicious format or comprises non-allowed or suspicious content or represents a non-allowed or suspicious request or instruction.

The identity of the further device may be determined in any suitable fashion, for example using a MAC address or other identifying element, or a value, optionally an encrypted value, stored in a secure storage area of the further device or the device.

The controller may be configured to implement a blacklisting and/or white-listing process. For example, the controller may be configured to allow, or at least partially block or redirect, communication between the device and the further device, if the device or the further device is identified as being on a list or authorised or non-authorised devices or types of devices.

The further device may be configured for optical wireless communication. The further device may be an external sensor. The further device may be an external position sensor, for example GPS or RFID or any other suitable sensor, configured to send a control signal when the device enters or leaves a particular area. The further device may be configured for geo-fencing. The control signal may be based on the further device being configured to allow communication or disallow communication therewith. The control signal may be based on the further device being secured or unsecured or having a security score above a predetermined threshold.

The control signal may be one of an Ethernet signal, a wired signal, a wireless signal, for example an RF signal. The control signal may comprise or form part of a further optical wireless communication signal.

The control signal and/or further optical wireless communication signal may have a different wavelength to the optical wireless communication signal and/or one or both of the control signal and further optical wireless communication signal may have substantially the same wavelength as the optical wireless communication signal.

The transmitter may be configured to transmit modulated light and/or the receiver may be configured to receive modulated light, and the modulated light may comprise at least one of infra-red radiation, ultra-violet radiation, visible light. The transmitter may be configured to transmit first modulated light having a first wavelength and the receiver may be configured to receive second modulated light having a second wavelength The device may comprise indicating means, for example an indicator, for providing an indication that the at least one adjustable shutter element is in the first or second configuration and/or that the at least one adjustable shutter element has changed configuration.

The indication may comprise a physical change to the position of the adjustable shutter element. The indication may comprise at least one of: a light output (for example obtained by operation of an indicator light), an indicator provided on a display associated with the device, a sound, a vibration or other haptic indication.

According to a further aspect of the invention, there is provided an optical wireless communication system comprising: a plurality of optical devices according to any of the preceding claims each having a respective at least one adjustable shutter element; a controller configured to control operation of each of the plurality of shutter elements.

The plurality of optical devices may be provided as separate devices, for example, one or more access points. The controller may be provided separately, for example, as part of a station.

The controller may be configured to selectively control shutter elements of at least two of the devices thereby to allow, prevent or restrict communication between said at least two of the device.

In a further aspect, which may be provided independently, there is provided a method of controlling optical wireless communication comprising operating at least one adjustable shutter element associated with at least one of a transmitter and a receiver by moving the adjustable shutter element between a first configuration and a second configuration, wherein in the first configuration the at least one adjustable shutter element is configured to at least partially block or partially redirect light having a first selected property and at least partially allow light having a second selected property to pass through unaffected such that transmission and/or reception of an optical wireless communication signal by the at least one of the transmitter and the receiver is substantially altered.

In another aspect, there is provided a computer program product comprising computer readable instructions that are executable to perform a method as claimed or described herein.

Features in one aspect may be applied as features in any other aspect, in any appropriate combination. For example, device features may be provided as method features or vice versa.

BRIEF DESCRIPTION OF THE DRAWINGS

Various embodiments of the invention will now be described by way of example only, and with reference to the accompanying drawings, of which.

DETAILED DESCRIPTION OF THE DRAWINGS

Figure 1:
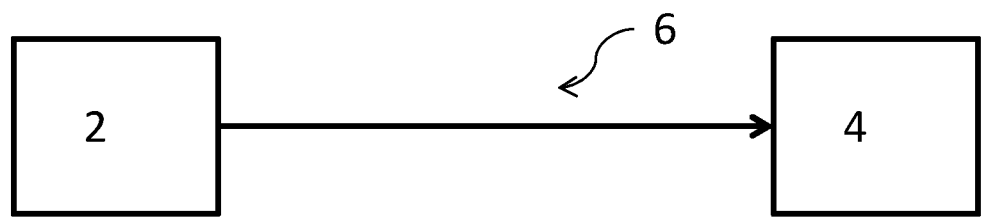
FIG. 1 is a schematic diagram of an optical wireless communication system.

FIG. 1 is a schematic block diagram illustrating principles of optical wireless communication according to embodiments. FIG. 1 shows a transmitter 2 and a receiver 4. The transmitter 2 is configured to send wireless optical signals in which information is encoded through an optical communication channel 6 to the receiver 4. The optical communication channel 6 may be a free-space communication channel.

Transmitters and receivers may be provided on different devices. One type of device that is used is an access point. Access points may provide access to a further network. Another type of device is a station. Stations may be mobile or fixed. Without limitation, examples of stations include personal computers, desktops, laptops and smart devices.

The transmitter 2 includes a light emitting diode (LED), or other suitable light source, and an associated driving circuit to drive the LED to produce the optical signal. The associated driving circuitry includes a digital to analogue convertor configured to provide a modulation signal at a frequency characteristic of an optical light communication signal. A further processor (not shown) modulates data onto a drive current and the driving circuitry (not shown) provides the drive current to the LED. The LED (not shown) then produces an outgoing modulated optical wireless communication signal that carries the data.

The receiver 4 includes a photo-diode, or other suitable light detector, with associated circuitry to condition any received signal. The photo-diode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signals can then be provided to a further processor to be demodulated to extract communication data.

Any suitable modulation scheme may be used, for example orthogonal frequency division multiplexing (OFDM) modulation schemes are used in some embodiments, and the demodulation is a demodulation from the OFDM modulation scheme. In further embodiments, other modulation schemes may be used.

Optical wireless communication typically relies on line of sight or reflection, and/or light guides, between the transmitter and receiver. Each transmitter has a characteristic field of view, in which a corresponding receiver can receive an optical signal from the transmitter. Each receiver also has a characteristic field of view, in which a corresponding transmitter can transmit an optical signal to the transmitter.

A device may have both a transmitter and a receiver thereby allowing the device to transmit and receive optical wireless communication signals. A transmitter and receiver may be provided together on a single device as a transceiver configured to transmit and receive optical wireless communication signals. The receiver may be configured to receive light signals at a first wavelength and the transmitter is configured to transmit at a second wavelength. For example, the outgoing light signal may be an infra-red signal generated by an infra-red diode and the incoming light may be a visible light signal.

By receiving light signals at a first wavelength and transmitting light signals at a second, different wavelength, a full duplex communications capability may be provided. Different wavelengths may be used for downlink communication (communication from one or more access points to a station) and for uplink (communication from a station to one or more access points). The device may receive on the first wavelength at the same time as transmitting on the second wavelength.

Each transceiver may have its own optics implemented to guide light to and from the transceiver and/or to intensify light. The optics may be provided as a separate optical component or could be integrated with the transceiver. Separate optical components may be provided for the receiver and the transmitter. The optics and transceiver may together define the field of view of the transceiver.

An access point may provide data transmission to and/or from a wired network or a WiFi or other wireless network and/or other optical wireless communications network, optionally a LiFi network.

Figure 2A:
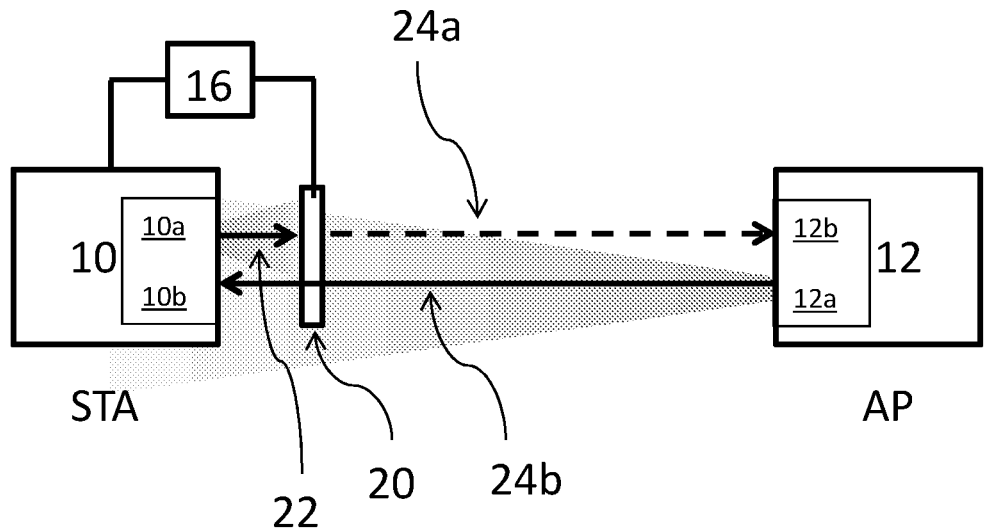
FIG. 2 is a schematic diagram of a shutter element associated with a transmitter.
Figure 2B:
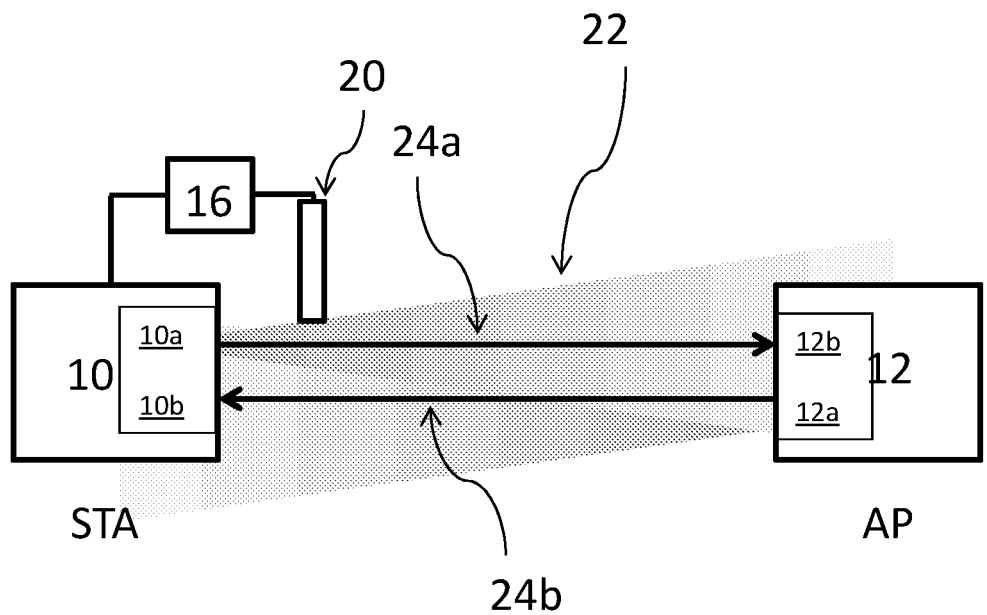
Figure 3A:
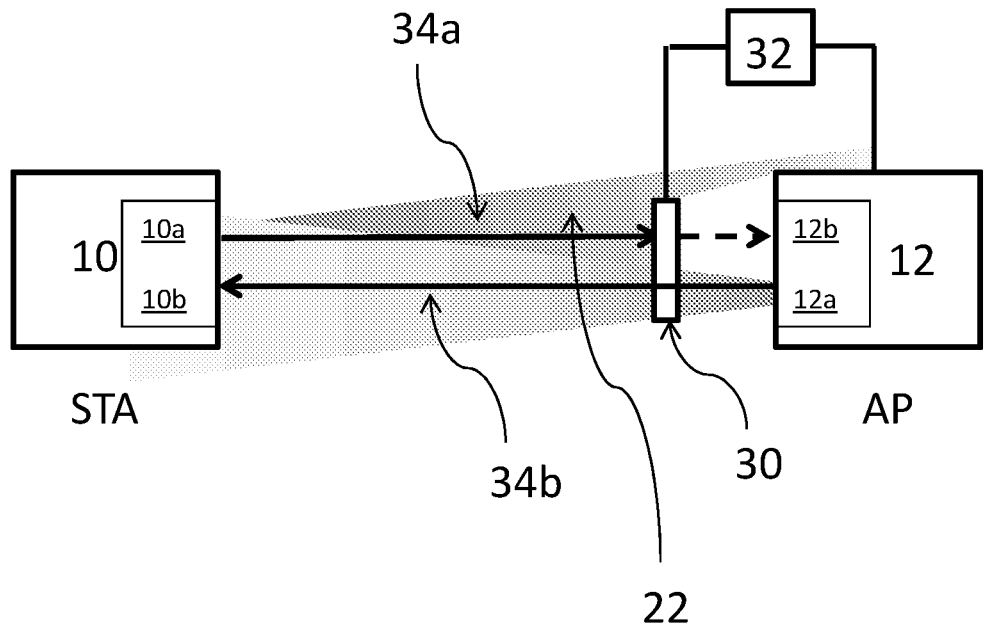
FIG. 3 is a schematic diagram of a shutter element associated with a receiver.
Figure 3A:
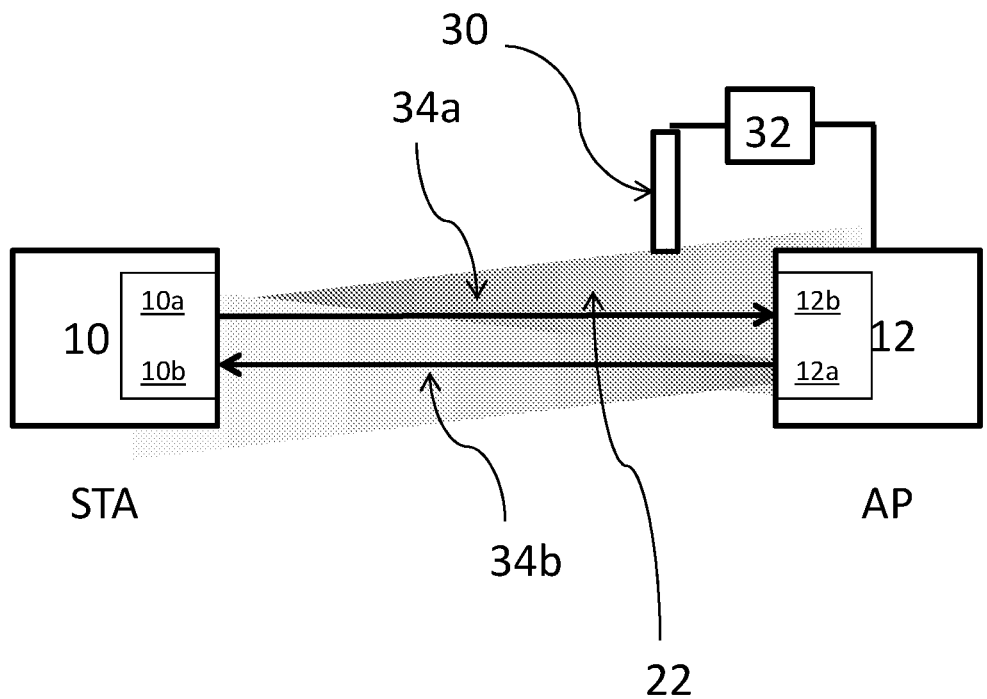

FIGS. 2 and 3 are schematic block diagrams illustrating systems comprising a transceiver 10 associated with a station (for example a mobile device) configured to communicate using optical wireless communication (OWC) with a transceiver 12 associated with an access point (AP).

The systems of the embodiments of FIGS. 2 and 3 include shutter elements that can be used to selectively wholly or completely block or redirect transmission or reception in one or both directions. Although particular configurations of the transceivers and the shutter elements are described with reference to FIGS. 2 and 3, it will be understood that any suitable configuration can be provided to provide selective blocking or redirecting of signals. It will also be understood that one or both of the transceivers could be replaced with receivers and/or transmitters in some embodiments, and that the transceivers/receivers/transmitters may be associated with any suitable combination of access point(s), station(s) or other device(s) in alternative embodiments.

FIG. 2(a) shows a shutter element 20 associated with a transceiver 10 of the station. The transceiver 10 comprises a transmitter 10a and a receiver 10b. FIG. 2(a) also shows the transceiver 12 associated with the access point. The transmitter 10a, receiver 10b and shutter element 20 may be in a first configuration or a second configuration.

The first configuration may be referred to as an at least partially closed configuration or an engaged configuration. The second configuration may be referred to as an at least partially open configuration or an unengaged configuration.

For example, in some cases the first configuration allows communication in a first direction or at a first wavelength and blocks or otherwise prevents communication in a second direction or at a second wavelength.

In some embodiments, the device may be configured to be adjustable into a third configuration in which communication is blocked or otherwise prevented for both directions and/or for both or all wavelengths. This may be referred to as a completely closed configuration. In further embodiments, any other suitable configurations may be provided, for example, providing partial or complete prevention of communication in selected directions or for selected wavelengths.

Returning to the details of the embodiment of FIG. 2, an adjustment mechanism 16 couples the transceiver 10 to the shutter element 20 and is operable to adjust the shutter element 20 between the first and second configurations.

The transmitter 10a has a field of view 22 in a first direction. The transmitter 10a is configured to produce optical signals carrying data and to transmit these signals through the field of view 22. The corresponding receiver 12b of transceiver 12 is configured to receive optical signals sent by the transmitter 10a when inside the field of view 22. When the receiver is in the field of view a channel, for example an uplink or a downlink, can be formed between the transmitter 10a and the receiver 12b. Likewise, a communication channel may be established between transmitter 12a of transceiver 12 and receiver 10b of transceiver 10.

In the embodiment of FIGS. 2(a) and 2(b) the shutter element 20 has opacity that varies with wavelength, such that it blocks light of wavelength(s) transmitted by the transmitter 10a (e.g. infra-red light) and is transparent to light of wavelength(s) to which the receiver 10b is sensitive (e.g. visible light). In the embodiment of FIGS. 2(a) and 2(b) the shutter element 20 is adjustable between the first and second configurations by physical movement of the shutter element. The physical movement is such that in the first configuration the shutter element is in the fields of view of the transmitter 10a and receiver 10b (thus blocking at least the infra-red light from the transmitter 10a, but allowing reception of visible light by the receiver 10b through the shutter element) and in the second configuration the shutter element 20 is removed from the fields of view of the transmitter 10a and receiver 10b allowing free passage of infra-red light and visible light from and to the transmitter 10a and receiver 10b.

The embodiment of FIGS. 2(a) and 2(b), using a moveable shutter with transparency/opacity that varies with wavelength, can be particularly useful in cases where a transmitter and receiver of a transceiver are closely spaced, for example as a transceiver unit (as is common for mobile phones or other portable devices for instance) so that a single shutter element (rather than separated dedicated transmitter and receiver shutters) is desirable, but where it is also desired to selectively block transmission whilst still allowing reception at the device.

Such an arrangement can have a variety of applications, including allowing authorisation procedures to be carried out before allowing transmission by the transmitter, whilst allowing a communication channel to be established or maintained between the receiver of the device and an access point or other, further device. The communication channel via the receiver can then be used, for example, to inform the device when authorisation has been obtained, and in response the device can move (or otherwise adjust) the shutter element so that transmission by the transmitter of the device is unblocked or otherwise enabled. Examples of authorisation and similar processes according to embodiments are described in more detail below. It will be understood that in alternative embodiments, a shutter arrangement such as that of FIG. 2 can be used to selectively block transmission rather than (or as well as) reception for instance by suitable choice of opacity versus wavelength properties, and can also be used at an access point or other device as well as or instead of at a mobile device or other station.

Returning to consideration of FIGS. 2(a) and 2(b) in more detail, FIG. 2(a) shows the transceiver 10 and shutter element 20 in the first configuration and FIG. 2(b) shows the transceiver 10 and shutter element 20 adjusted to be in the second configuration.

In the first configuration, the shutter element 20 is configured to at least partially block or partially redirect light having a first selected property, here represented by numeral 24a. In this example, the first selected property is a first wavelength. The shutter element 20 is likewise configured to at least partially allow light having a second selected property, represented by numeral 24b, to pass through the shutter element 20 unaffected. In this example, the second selected property is a second wavelength.

In some embodiments, at least one of the selected properties is an optical property, for example, a single or a range of wavelengths, or a polarisation of light. In some embodiments, the first wavelength may be a range of wavelengths and the second wavelength may be a single wavelength or vice versa. In other embodiments, the selected property is a propagation direction of light or a range of propagation directions. In other embodiments, the selected property is a data rate or a range of data rates.

In the second configuration, the shutter element 20 is configured to at least partially allow light having the first wavelength, represented by numeral 24a, to pass through the shutter element 20 unaffected. The shutter element 20 is further configured to allow light having the second wavelength, represented by numeral 24b, to pass through the shutter element 20 unaffected.

In some embodiments, the shutter element 20 is adjustable into a third configuration. In the third configuration, also referred to as a closed configuration, the shutter element 20 is configured to block or redirect light having both the first wavelength and the second wavelength. In such embodiments the shutter element 20 may be substantially completely opaque to all relevant wavelengths (e.g. both transmitter and receiver wavelengths) or for instance the shutter element may include more than one shutter, with different opacity versus wavelength properties (e.g. one of which may be substantially completely opaque) each of which can be selectively positioned relatively to the transmitter, receiver and/or transceiver.

In some embodiments, the shutter element 20 is configured to be adjusted between the first and second configurations only; between the first and third configurations only; between the first, second and third configurations; or between any other configuration or desired combination of configurations.

By adjusting between different configurations, transmission of optical wireless communication signals by the transmitter and/or reception of optical wireless communication signals by the receiver is substantially altered. By adjusting between different configuration transfer of data via the optical wireless communication signal is at least one of reduced, disrupted or restricted.

In operation of the embodiment of FIG. 2, the transmitter 10a and shutter element 20 are first provided, by way of example, in the first configuration. Light is generated and emitted by the transmitters 10a and 12a. The light of 10a has at least a first wavelength and the light of 12a has at least a second wavelength. Data is encoded onto the light, either by the transmitter or associated circuitry to form optical signals. In this example, a first set of data is encoded onto the light from transmitter 10a to form a first optical signal and a second set of data is encoded onto light from transmitter 12a to form a second optical signal.

In the first configuration, shown in FIG. 2(a), the first optical signal is transmitted by the transmitter 10a in the direction of 24a but is blocked by the shutter element 20. The second optical signal is transmitted by the transmitter 12a in the direction 24b. By impeding the first optical signal, the shutter element 20 prevents the formation of a first communication channel at the first wavelength between the transmitter 10a and the receiver 12b and hence the transfer of first data from the transmitter 10a to the receiver 12. Thus first data carried by the first optical signal is not recoverable by the receiver 12b or by processing circuitry associated with the receiver 12.

The shutter element 20 does not impede the second optical signal thus allowing the second optical signal to continue towards the receiver 10b unaffected. Hence a second communication channel at the second wavelength is formed between the transmitter 12a and the receiver 10b. The receiver 10b then receives the second optical signal so that the second data carried by the second optical signal can be recovered by the receiver 10b or processing circuitry associated with the receiver 10b.

The adjustment mechanism 16 is then operated to adjust the shutter element 20 from the first configuration to the second configuration. Different embodiments of the adjustment mechanism are described in further detail with reference to FIGS. 4 and 5.

In the second configuration, the first optical signal is transmitted by the transmitter 10a in the direction of 24 a and the second optical signal is transmitted by the transmitter 12a in the direction of 24b. The shutter element 20 allows both the first and second optical signals to pass through unaffected. Hence a first communication channel at the first wavelength between the transmitter 10a and receiver 12b is generated and the second communication channel at the second wavelength between transmitter 12a and 10b is maintained.

The selective switching between first and second configurations as described in relation to FIG. 2(a) may be useful for a variety of applications.

For example the station (for instance a mobile device) that includes transceiver 10 may be configured not to transmit data, or at least not to transmit secure data to the station at which transceiver 12 is located, until it has been established that, for instance, the station is secure or authorised and/or until it has been established that no non-authorised devices are present in the environment of the station/transceiver 10 or the access point/transceiver 12. In the first configuration data continues to be transmitted from access point to station via 24b even when the shutter 20 is in the first configuration.

The light 24a may be used to transmit a validation signal representing for instance at least one property of the station (for example identity or security status) or the result of a security process conducted by the station or other device (for example an outcome of a polling process or other process to determine whether other, potentially unauthorised, device are present). A controller at the station and/or associated with the shutter 20 or transceiver 10 may move the shutter 20 and/or transmitter 10a from the first configuration to the second configuration in response to the validation signal, thereby allowing transmission of data from the station to the access point via transmitter 10a and receiver 12b.

The shutter element 20 in some embodiments also provides a user with a visual indication as to the status of data transmission by the transmitter 10. A user can tell by a quick visual inspection if the shutter element 20 and/or transceiver 10 are in a closed or at least partially closed configuration. This provides a failsafe physical indicator to the user that data is secure and not being intercepted by an unwanted third party receiver. In some embodiments, further indicating means, for example an indicator device, are provided for providing an indication that the adjustable shutter element is in the first or second configuration or in any other selected configuration. The indicating means may also or alternatively indicate that the at least one adjustable shutter element has changed configuration. The indicating means may be a separately provided indicator light that, for example, turns on and off and/or changes colour when the configuration is a first configuration or a second configuration. In some embodiments, the indicating means is an indicator provided on a display associated with the device or means for producing a sound or a vibration. The indicating means may be part of the device on which the transmitter and/or receiver is provided, for example, the indicating means may use vibration/display/sound functionality of a smart device or computing resource, or any other suitable output of any desired device.

In some embodiments, only the first or the second component of light carries data, for example, substantially no data is encoded onto either the first or second component of light. As an example, the first component of light has a non-visible wavelength of light as the first selected property and this non-visible component has data encoded onto it and the second component of light has a range of visible wavelengths as the second selected property. In this example, the shutter element 20 is adjustable to block and/or redirect only the non-visible, data carrying component, of light in the first configuration thereby leaving the visible component of light unaffected.

In some embodiments, the first wavelength or range of wavelengths may correspond to infra-red light and the second wavelength or range of wavelengths may correspond to visible light or vice-versa.

In some embodiments, the first data is encoded onto the first component of light at a first data rate and the second data is encoded onto the second component of light at a second data rate. The first data rate may be higher or lower than the second data rate. In some embodiments, the first data represents less sensitive information (for example a identifier data, such as a MAC address or other identifying token) and the second data represents more sensitive information or vice versa.

The shutter element 20 is configured to block or redirect light. In some embodiments, the shutter element is configured to scatter incident light such that any data carried by the light is unrecoverable.

In other embodiments, encrypted data may be encoded onto the first component of light and unencrypted data may be encoded onto the second component of light. In other embodiments, security may be enhanced by encoded part of a message or information on the first component and part of a message or information on the second component such that the original message is recoverable only if both components of light are successfully received. Alternatively, or in addition, the second component may carry encrypted data and the first component may carry a key to unencrypting the data of the first component.

FIG. 3 is a schematic block diagram showing a shutter element 30 associated with the transceiver 12 of the access point. The shutter element 30 shown in FIG. 3 corresponds to the shutter element 20, as shown and described with reference to FIG. 2. In addition, FIG. 3 shows an adjustment mechanism 32 that couples the receiver 12b to the shutter element 30 and is operable to adjust the shutter element 30 between the first and second configuration. The adjustment mechanism 32 corresponds to the adjustment mechanism 16, shown in and described with reference to FIG. 2.

The shutter element 30 is configured, as described with reference to the shutter element 20 FIGS. 2(a) and 2(b), to be adjustable between a first and second configuration. The shutter element 30 is shown in the first configuration in FIG. 3(a) and in the second configuration in FIG. 3(b). In the first configuration, the shutter element 30 is configured to at least partially block or partially redirect light having a first selected property, here represented by numeral 34a. In this example, the first selected property is a first wavelength. The shutter element 30 is likewise configured to at least partially allow light having a second selected property, represented by numeral 34b, to pass through the shutter element 30 unaffected. In this example, the second selected property is a second wavelength.

In the second configuration, the shutter element 30 is configured to at least partially allow light having the first wavelength, represented by numeral 34a, to pass through the shutter element 20 unaffected. The shutter element 30 is further configured to allow light having the second wavelength, represented by numeral 34b, to pass through the shutter element 30 unaffected.

For brevity, it is noted that the operation of the shutter element 30 is substantially the same as the operation of the shutter element 20, described with reference to FIG. 2.

Figure 4:
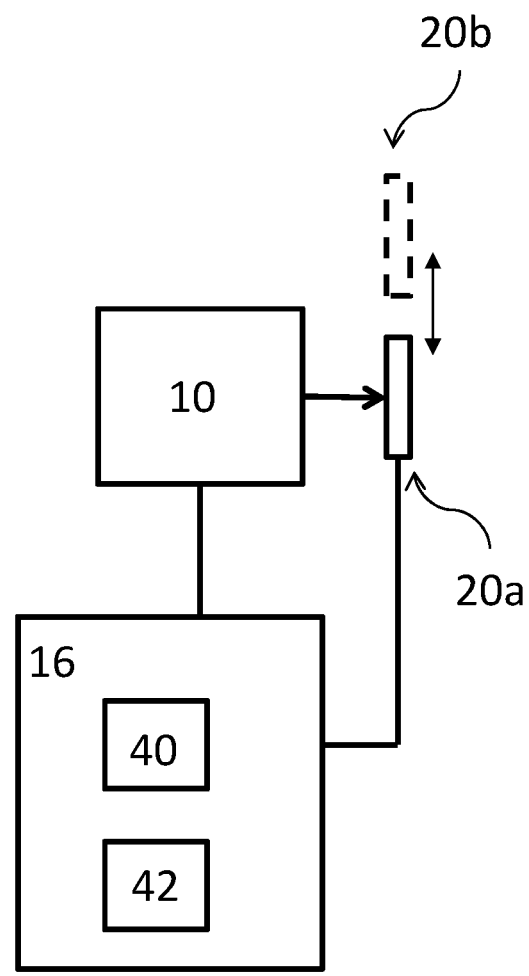
FIG. 4 is a schematic diagram of a shutter element and a first adjustment mechanism.
Figure 5:
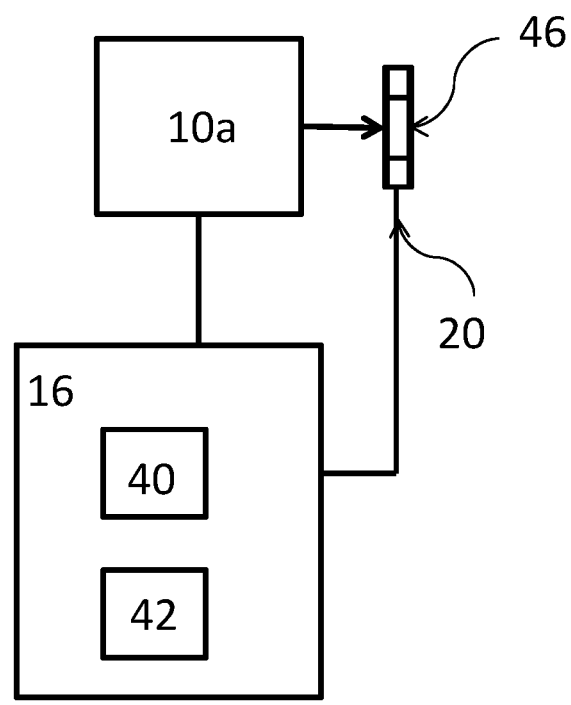
FIG. 5 is a schematic diagram of a shutter element and a second adjustment mechanism.

In some embodiments, a shutter element may be provided that has one or more surfaces that allow light having different optical properties to be blocked and/or redirected by different amounts in dependence on which surface the light is incident on. FIGS. 4 and 5 show a first example of an adjustment mechanism corresponding to transmitter side adjustment mechanism 16 or receiver side adjustment mechanism 32.

In some embodiments, and as described with reference to FIG. 4, a change in configuration may be implemented through a mechanism allowing the transmitter 10a and shutter element 20 to move relative to each other. In other embodiments, as described with reference to FIG. 5, the transmitter 10a and shutter element 20 remain in a fixed position relative to each other and the change in configuration may be implemented through suitable non-mechanical means.

FIG. 4 shows an embodiment of the adjustment mechanism 16. The adjustment mechanism 16 has a drive arrangement, also known as a drive mechanism 40. The adjustment mechanism 16 may also have a controller 42. The drive mechanism 40 is coupled between the transmitter 10, or the device that the transmitter 10a is provided as part of, and the shutter element 20.

The drive mechanism is configured to move the shutter element 20 relative to the transmitter 10 or to move the transmitter 10a relative to the shutter element 20. In some embodiments, the transmitter 10a may move and the transmitter shutter element 20 may be fixed. In alternative embodiments, both the transmitter 10a and the transmitter shutter element 20 may move.

In some embodiments, the adjustment mechanism 16 includes a controller 42 to provide control signals to control operation of the drive mechanism 40 thereby to adjust the shutter element 20. The controller 42 can be in communication with a processing resource or further sensor. In some embodiments, at least one of the processing resource and/or further sensor is part of a further device. In other embodiments at least one of the processing resource and/or sensor forms part of the same device as the transmitter 10a.

The drive mechanism 40 may be manually operable. For example, a user may be able to move the shutter element 20 between the first and second configurations by hand, as denoted by reference 20a and 20b. In a further example, the user may be able to operate a further sensor by hand, for example a switch, to provide a control signal to the drive mechanism to move adjust between the first and second configuration.

In some embodiments, the drive mechanism may be electrically, magnetically or electro-magnetically powered.

As a first example, the drive mechanism 40 includes a slide mechanism to substantially cover the transmitter with the shutter element. A transmitter is provided on a device, and the shutter element slides over the transmitter to cover the transmitter. By operating the sliding mechanism the shutter element can be adjusted between the first and second configuration.

Alternatively, the shutter element is fixed relative to the device, and the transmitter is provided on a sliding member to slide under the shutter element. Alternatively, in a further example, the same function can be achieved using a flipping mechanism where the shutter element is pivotably mounted to the device and moveable to cover the transmitter.

In a further example, the shutter element is implemented as a part of a member having a cavity. The member is provided on the device together with a guide or other guiding means configured to guide the transmitter into the cavity. The material of the cavity, for example the cavity walls, may be at least partially opaque to some wavelengths and at least partially transparent to other wavelengths, in some embodiments. Similarly any other components of or associated with the shutter element (either moveable or stationary) may be at least partially opaque to some wavelengths and at least partially transparent to other wavelengths in order to provide desired wavelength-dependent blocking effects.

In some embodiments, the shutter element and adjustment mechanism has a diaphragm structure, through which an opening is defined that allows light to pass through, wherein the diaphragm is controllable to control the size of the opening. The size of the opening may be controllable by manual adjustment or may be controllable by control signals. The diaphragm may be an iris diaphragm or a spiral shutter with an outer element that has an adjustable outer element to control the size of the opening. In some embodiments, the size of the opening is selected from a continuous range of sizes or is selected from a pre-determined set of sizes.

In some embodiments, the diaphragm may be a rotatable plate element with a plurality of opening of different sizes that are positioned about the plate element. The rotatable plate element is coupled to a rotation mechanism so that, on rotation, a different opening of the plate element is presented to the transmitter for emitting light and optical signals through.

In some embodiments, the diaphragm is arranged so that in a first configuration a first component of light that has a first direction of propagation is substantially blocked and/or redirected and a second component of light that has a second direction of propagation is allowed to pass through unaffected. The material of the diaphragm may be at least partially opaque to some wavelengths and at least partially transparent to other wavelengths, in some embodiments.

In some embodiments of the adjustment mechanism, the shutter element has non-mechanical means that are adjustable between the first and second configurations of the shutter element and the associated receiver or transmitter. FIG. 5 shows an example of a non-mechanical embodiment of the shutter element 20. By way of example only, the shutter element described is a transmitter shutter element 20 arranged to at least partially block light from a transmitter 10a, but alternatively could be arranged to at least partially block light from a receiver or transceiver.

The shutter element 20 has a window 46, which may also be referred to as a window element. The window 46 is adjustable between a first mode and a second mode which correspond to the first and second configurations. The window 46 in the first mode has different optical properties to the window in the second mode. The window 46 in the first mode is substantially transparent to light and the window 46 in the second mode is substantially opaque. The window 46 is configured to receive a physical stimulus and, in response to the physical stimulus, to change between the first mode and the second mode. The window 46 provides for a reversible change. The shutter element and its associated receiver, transmitter or transceiver are adjustable between a first and second configuration by providing a physical stimulus to the window 46 of the shutter element.

In some embodiments the physical stimulus is at least one of electronic, chemical, thermal or an optical stimulus. In some embodiments, the window element is formed out of a window element material. The window element material may be made from at least one of: a smart-glass material, a switchable glass material, liquid crystals, for example polymer dispersed liquid crystals, suspended particles, microblinds, an electrochromic material, a thermochromic material, a photochromic material, a microelectromechanical system (MEMS) element. In some embodiments, the window may be a thin flexible sheet formed out of one of these materials.

In some embodiments, as described above, a further processing resource may be provided as part of the transmitting and/or receiving device or as part of a further device.

In some embodiments, the control signal is based on at least on one attribute of the further device, for example, a location of the further device, an identity of the further device, an operating status or setting of the further device, a security status or setting of the further device or a communication status of the further device, or any other suitable attribute. Further examples of attributes that can be used in some embodiments include whether the further device is in communication range of the device and/or in a field of view of the device, whether or not the further device or the device is on list of authorised or unauthorised device, for example a white list or black list, whether or not data sent from the further device is in a non-allowed or suspicious format or comprises non-allowed or suspicious content or represents a non-allowed or suspicious request or instruction.

The identity of the further device may be determined in any suitable fashion, for example using a MAC address or other identifying element, or a value, optionally an encrypted value, stored in a secure storage area.

The controller may be configured to implement a blacklisting and/or white-listing process. For example, the controller may be configured to allow, or at least partially block or redirect, communication between the device and the further device, if the device or the further device is identified as being on a list or authorised or non-authorised devices or types of devices.

The further processing device may be configured to provide a signal to the controller 40 based on an authentication process such that the shutter element is placed into a first or second configuration based on the authentication process.

As a first example, an authentication process is initiated by a further device that is in communication with the device with the shutter element. The controller 40 is configured to send a control signal to adjust the shutter element in the event that the device or the further device fails to complete the authentication process. This may be implemented by in response to a predetermined time elapsing between initiation and a response being received or in response to signal representing failure of the authentication process being received.

The device may be further configured to detect an unauthorised process or event and to initiate an authentication process in response to this detection. The authentication process may be a biometric authentication. The authentication process may be based on at least one of a location of optical device relative to a further device, user credentials, time, a predetermined schedule, a password, identity and/or status of the further device. The authentication process may be carried out in accordance with an authentication protocol, optionally, wherein the authentication protocol is one of: a challenge handshake authentication protocol, a 4-way handshake protocol, a 4-way handshake protocol as specified in 802.11.

In a further embodiment, the controller is configured to provide a control signal that has a switching frequency that causes the shutter element to be adjusted between the first configuration and the second configuration at the switch frequency. By adjusting the shutter element at the switching frequency, a first optical signal having a first data rate is substantially blocked and/or redirected by the shutter element and a second optical signal having a second data rate is allowed to pass through unaffected. In this way, first data encoded on light at a first data rate is not transmitted and second data encoded on light at a second data rate is transmitted.

In a yet further embodiment, the controller is configured to provide a control signal that has a control pattern that causes the shutter element to be adjusted between the first configuration and the second configuration following a pre-determined switch pattern. The switch pattern allows additional information to be encoded onto the optical signals. The corresponding receiver or associated circuitry may be configured to decode and take an action based on the switch pattern.

Figure 6:
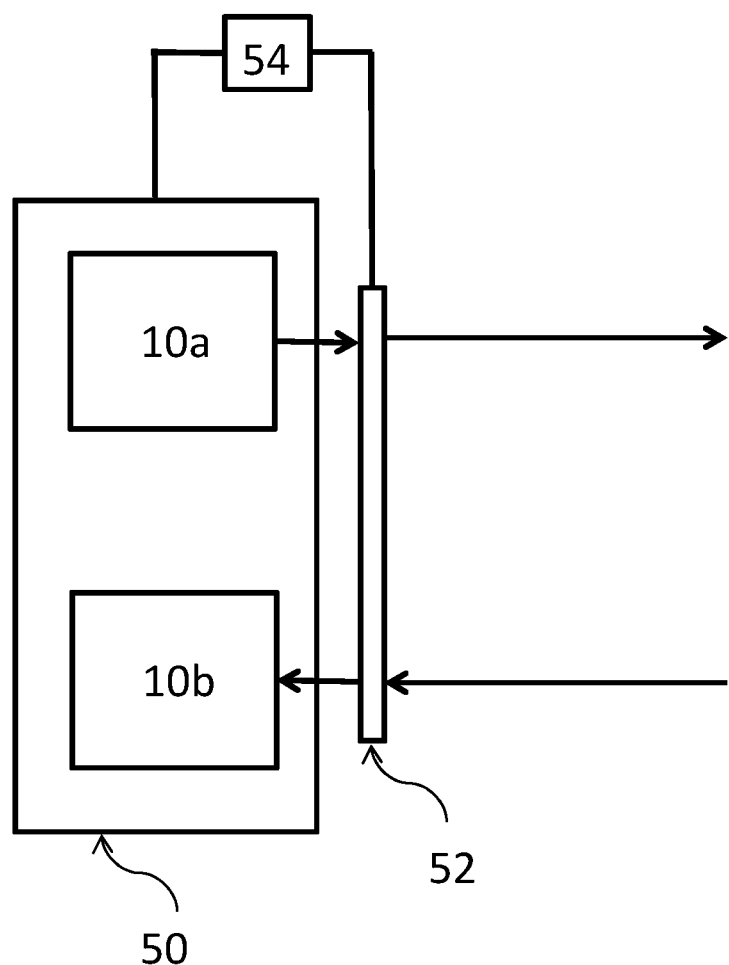
FIG. 6 is a schematic diagram of a shutter element associated with a transmitter and a receiver.

FIG. 6 shows an embodiment wherein a device 50 has both a transmitter 10*a* and receiver 10*b*. FIG. 6 shows the transmitter 10*a* and receiver 10*b* with a single shutter element 52 configured to substantially block both transmitted and received signals. The single shutter element is coupled to an adjustment mechanism 54. In some embodiments, independently adjustable transmitter shutter elements and receiver shutter elements may be provided, together with respective adjustment mechanisms. The single shutter element 52 is operable as described with reference to the shutter elements shown in any of the other Figures.

In some embodiments, a single shutter element 52 may be provided that has one or more surfaces that allows light having different optical properties to be blocked and/or redirected by different amounts in dependence on which surface the light is incident on.

For example, in a first configuration, light of a first wavelength may pass through the single shutter element from the surface nearest to the device to the other side while blocking light having a second wavelength from passing through the shutter element in the opposite direction.

The above described shutter elements and adjustment mechanism can be implemented and/or integrated into different devices. For example, they may be incorporated into both stations or access points. They may be incorporated into self-contained or other devices. The devices can be mobile or fixed.

The shutter elements may be implemented to block or otherwise prevent uplink or downlink. By blocking or otherwise preventing uplink, intercepting of data may be prevented, and by blocking or otherwise preventing downlink, protection of control may be provided.

As an example implementation, a receiver shutter element and/or transmitter shutter element and/or transceiver shutter element may be incorporated into a camera device that is enabled for optical wireless communication. The camera has one or more receivers and transmitters or transceivers. The shutter elements may operate to block reception and/or transmission of optical wireless communication signals but allow the camera and/or flash to continue to operate.

Figure 7:
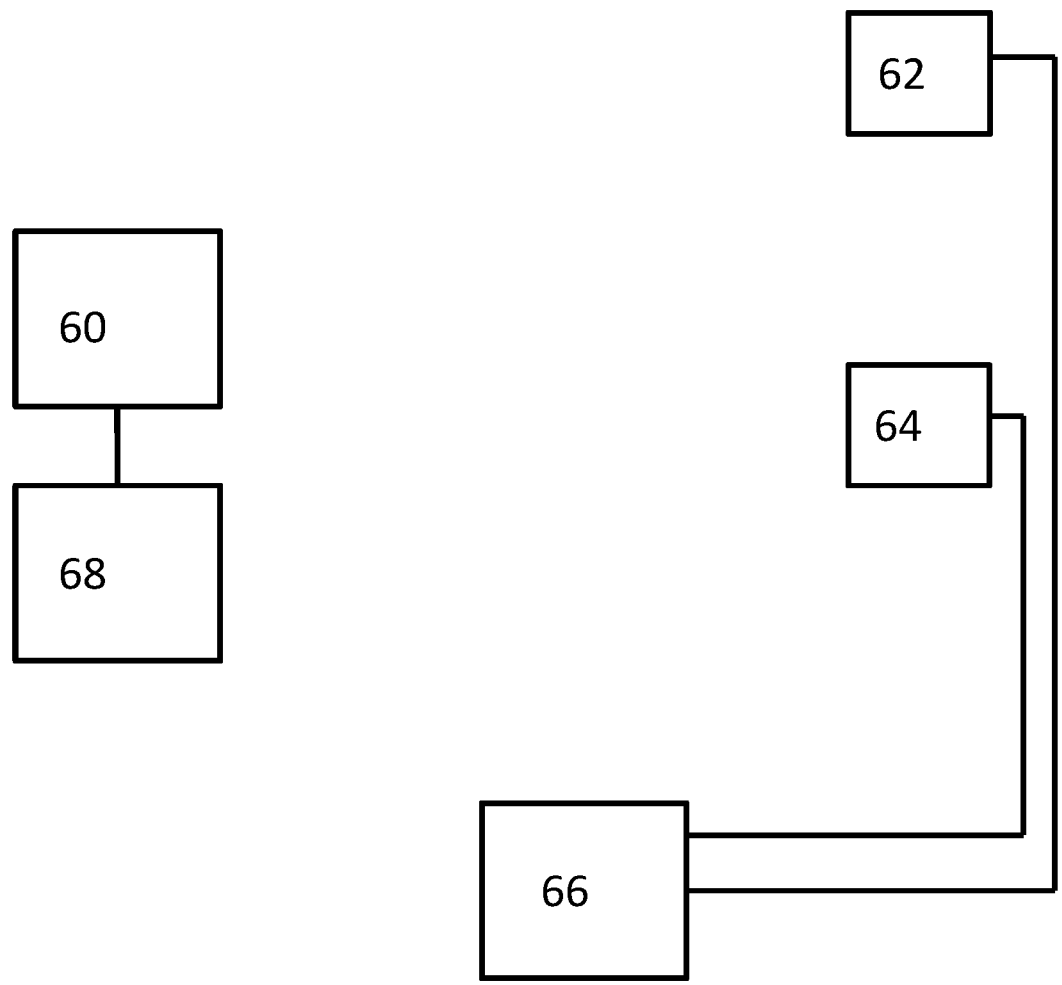
FIG. 7 is a schematic diagram showing an arrangement of an access point and stations.

FIG. 7 shows an example embodiment of how an access point and, optionally, an associated external network can be protected from malicious signals from stations. FIG. 7 shows an access point 60 and two stations 62 and 64 respectively. The access point 60 and the stations 62, 64 all have a transmitter and a receiver, respectively, and therefore have transmission and reception capabilities. A central controller 66 is provided that provides administrative control of the stations 62, 64 and the access point 60. The access point 60 may be connected to an external network 68 and provide the stations 62, 64 with access to the external network, via optical wireless communication.

Each station, in this embodiment, has a shutter element associated with its receiver and an independent shutter element associated with its transmitter. The shutter elements are configured to be independently adjusted by control signals, for example, as described with reference to FIG. 4 and FIG. 5.

A central controller 66 is configured to provide the control signals to the stations through any suitable means. In some embodiments, the central controller, stations and access point are part of the same network. This network can be wireless for example, WiFi, or a wired network, for example using Ethernet. The network may combine elements of wired and wireless networks. In some embodiments, the control signal is carried by an optical signal sent by a further transmitter. In some embodiments, the central controller 66 may be connected to the access point 60 and control signals may be administered to the stations 62 and 64 by optical signals.

The controller 66 may be instructed to send a control signal to the stations 62 and 64 either automatically or manually. For example, a user may observe or anticipate suspicious network activity and wish to shut down transmission from all stations. In an alternative example, a processor associated with the access point may measure or sense suspicious activity or an indicator thereof and automatically send a control signal in response.

Once the control signal is received, the stations 62 and 64 proceed to adjust their shutter elements so that transmission from the stations is substantially blocked or otherwise prevented in response to the control signal being received.

A further control signal can be sent, substantially as described with reference to the first control signal, by the central controller instructing the stations 62, 64 to adjust the shutter elements so that transmission from the stations is unblocked or otherwise allowed.

As the receiver and transmitter shutter elements of the stations are independently adjustable, the receiver shutter elements and corresponding receivers of the stations remain in an open configuration. Therefore, the further control signal can be sent via optical wireless communication to the stations to re-enable transmission of the stations by opening the transmitter shutter element.

Figure 8:
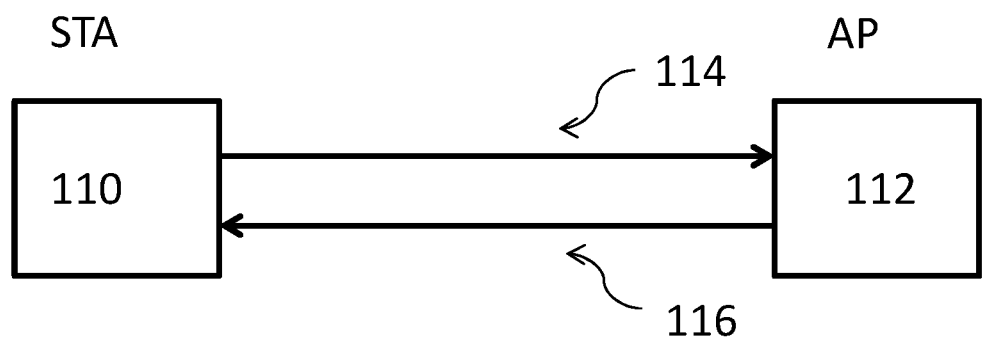
FIG. 8 is a schematic diagram of a station and corresponding access point.

FIG. 8 shows a schematic diagram of a station 110 and access point 112 in optical communication with each other over an uplink 114 and a downlink 116. The uplink uses light having a first wavelength, referred to as a uplink wavelength, and the downlink uses light having a second wavelength, referred to as an downlink wavelength.

The access point 112 (AP) has a transmitter (AP TX) and receiver (AP RX) and a transmitter shutter element associated with the transmitter and a receiver shutter element associated with the receiver. The station 110 (STA) also has a transmitter (STA TX) and receiver (STA RX) and a transmitter shutter element associated with the transmitter and a receiver shutter element associated with the receiver. The transmitters and receivers and shutter elements are as described previously, in particular, the shutter elements are independently adjustable and independently controlled.

Figure 9:
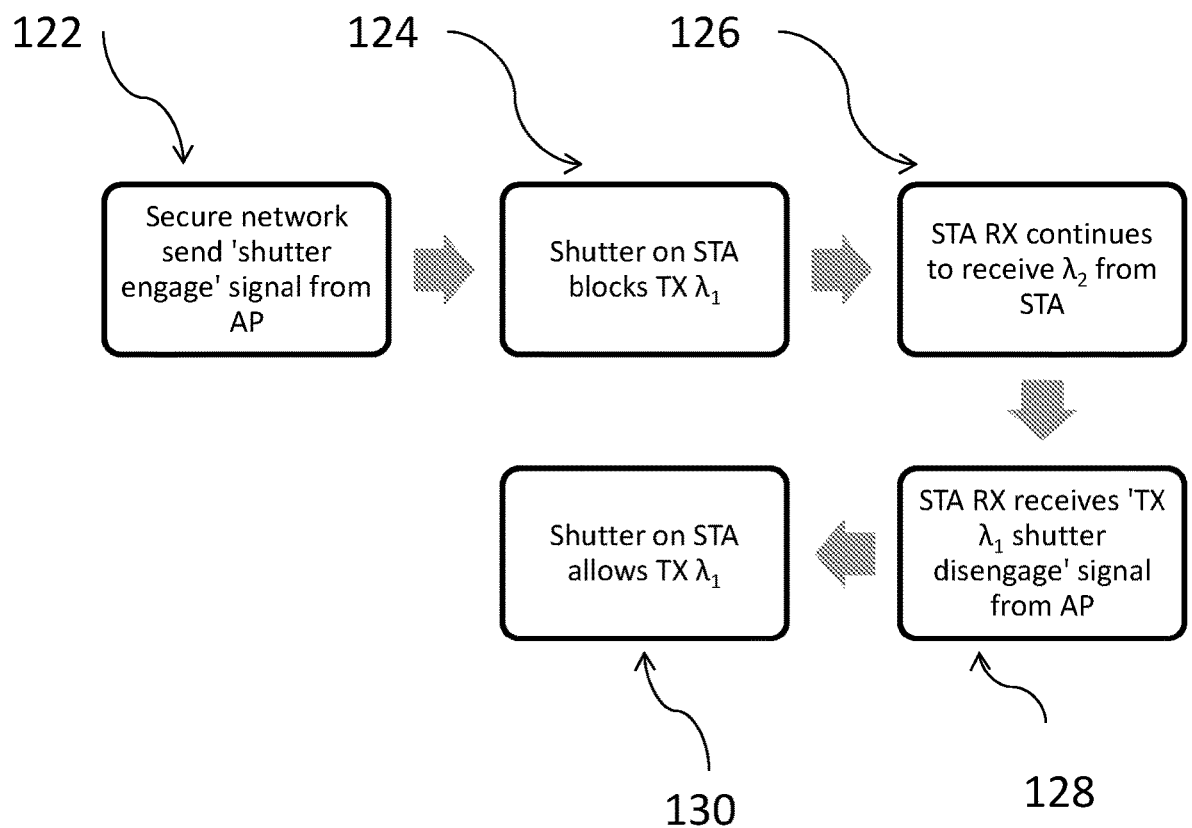
FIG. 9 is a flow-chart demonstrating co-operation between station and access point.

FIG. 9 shows a method of operation between the AP 112 and STA 110. At step 122, AP TX sends a control signal, via an optical wireless signal over the downlink 116, that includes the instructions "engage shutter" to the STA. At step 124, STA RX receives the control signal and decodes the control signal to recover the instructions. Based on these instructions, the STA moves the shutter element to block and/or redirect transmission from the STA TX of an optical signal at $\lambda_2$.

At step 126, despite blocking the STA TX wavelength, the STA RX continues to receive further signal at the first wavelength. At step 128, STA RX then receives $\lambda_1$ shutter disengage control signal from the AP and disengages the shutter at step 130 such as to allow transmission at the first wavelength.

In the above description, embodiments are described with reference to a transceiver and a shutter element. For the avoidance of doubt, these embodiments can also be implemented as two shutter elements corresponding to a transmitter and a receiver, respectively or a single shutter element corresponding to a transmitter or receiver.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. An optical wireless communication device comprising:
   a transmitter and a receiver configured to transmit and/or receive light comprising an optical wireless communication signal representing data;
   at least one adjustable shutter element associated with the transmitter and a receiver,
   wherein the transmitter transmits the light at a first wavelength, the receiver is sensitive to the light at a second, different wavelength, and the at least one adjustable shutter element has a wavelength-dependent transparency such that it is transparent to light at one of the first wavelength and the second wavelength, and opaque to light at the other of the first wavelength and the second wavelength,
   wherein the at least one adjustable shutter element and the associated transmitter and receiver are adjustable between a first configuration and a second configuration such that in the first configuration the at least one adjustable shutter element is configured to at least partially block or partially redirect light having a first selected property and at least partially allow light having a second selected property to pass through unaffected wherein the at least one adjustable shutter element covers both the transmitter and the receiver when in the first configuration such that transmission and/or reception of the optical wireless communication signal by the transmitter and the receiver is altered.

2. The device according to claim 1, wherein the at least one shutter element further comprises a mechanism for moving the at least one adjustable shutter element having a wavelength-dependent transparency into or out of a field of view of the transmitter and/or the receiver to adjust between the first configuration and the second configuration.

3. The device according to claim 1, further comprising a controller configured to establish a communication channel with an access point or further device via the receiver whilst preventing transmission from the transmitter to the access point or further device, and to move from the first configuration to the second configuration in response to a signal received through the communication channel thereby to allow transmission of data by the transmitter to the access point or further device when in the second configuration.

4. The device according to claim 1, wherein the at least one adjustable shutter element comprises a first adjustable shutter element associated with the transmitter and a second adjustable shutter element associated with the receiver.

5. The device according to claim 4, wherein the first and second adjustable elements are configured to be adjusted independently.

6. The device according to claim 1, wherein at least one of a), b) or c):
   a) the transmission and/or reception of the optical wireless communication signal is altered such that transfer of the data via the optical wireless communication signal is at least one of reduced, disrupted or restricted;
   b) the device further comprises a mechanism for moving the at least one adjustable shutter element relative to at least one of the transmitter and the receiver to adjust between the first configuration and the second configuration;
   c) in the second configuration and the first configuration the at least one adjustable shutter element at least partially covers the at least one of the transmitter and the receiver.

7. The device according to claim 1, wherein at least one of a) or b):
   a) the first selected property is a first wavelength in a first range of wavelengths and the second selected property is a second wavelength in a second range of wavelengths;
   b) the light having the first selected property comprises infra-red light and the light having the second selected property comprises visible light.

8. The device according to claim 1, wherein at least one of a) or b):
   a) the at least one adjustable shutter element and at least one of the transmitter and the receiver are configured to be manually adjusted by a user;
   b) the device further comprises a drive arrangement operable to adjust the at least one adjustable shutter element and the at least one of the transmitter and the receiver wherein the drive arrangement is electrically, magnetically and/or electro-magnetically powered.

9. The device according to claim 1, wherein the device further comprises a controller configured to automatically control adjustment of the at least one adjustable shutter element.

10. The device according to claim 1 wherein at least one of a) or b):
    a) the transmitter is configured to transmit modulated light and/or the receiver is configured to receive modulated light, and the modulated light comprises at least one of infra-red radiation, ultra-violet radiation, visible light;
    b) the device further comprises an indicator for providing an indication that the at least one adjustable shutter element is in the first or second configuration and/or that the at least one adjustable shutter element has changed configuration.

11. An optical wireless communication system comprising:
    a plurality of optical devices according to claim 1 each having a respective at least one adjustable shutter element;
    at least one controller configured to control operation of each of the plurality of shutter elements.

12. The system according to claim 11, wherein the at least one controller is configured to selectively control shutter elements of at least two of the devices thereby to allow, prevent or restrict communication between said at least two of the devices.

13. A method of controlling optical wireless communication comprising:
    operating at least one adjustable shutter element associated with an optical wireless communication signal transmitter and an optical wireless communication signal receiver wherein the transmitter transmits light at a first wavelength, the receiver is sensitive to light at a second, different wavelength, and the at least one adjustable shutter element has a wavelength-dependent transparency such that it is transparent to light at one of the first wavelength and the second wavelength, and opaque to light at the other of the first wavelength and the second wavelength; by moving the adjustable shutter element between a first configuration and a second configuration, wherein in the first configuration the at least one adjustable shutter element covers both the transmitter and receiver and is configured to at least partially block or partially redirect light having a first selected property and at least partially allow light having a second selected property to pass through unaffected such that transmission and/or reception of an optical wireless communication signal by the at least one of the transmitter and the receiver is altered.

* * * * *